United States Patent
Biryukov et al.

(10) Patent No.: US 12,499,108 B1
(45) Date of Patent: Dec. 16, 2025

(54) AUTOMATED DATA INSTANCE ASSIGNMENT

(71) Applicant: Ramp Business Corporation, New York, NY (US)

(72) Inventors: Anton Biryukov, Calgary (CA); Dylan Mann, San Francisco, CA (US); Ricky Meyers, Brooklyn, NY (US); Alejandro Borgonovo, Brooklyn, NY (US); Logan Willmott, Brooklyn, NY (US)

(73) Assignee: Ramp Business Corporation, New York, NY (US)

( * ) Notice: Subject to any disclaimer, the term of this patent is extended or adjusted under 35 U.S.C. 154(b) by 0 days.

(21) Appl. No.: 18/804,449

(22) Filed: Aug. 14, 2024

(51) Int. Cl.
 *G06F 16/00* (2019.01)
 *G06F 16/23* (2019.01)
 *G06F 16/28* (2019.01)

(52) U.S. Cl.
 CPC ........ *G06F 16/2379* (2019.01); *G06F 16/285* (2019.01)

(58) Field of Classification Search
 CPC .............. G06F 16/906; G06F 16/9038; G06F 18/2178; G06F 17/18; G06F 16/2379; G06F 16/285; G06N 20/00; G06N 5/025; G06N 3/088; G06N 3/08; G06Q 20/4016
 See application file for complete search history.

(56) References Cited

U.S. PATENT DOCUMENTS

2020/0380524 A1* 12/2020 Li .................. G06F 16/906
2023/0245124 A1   8/2023 Patel et al.

OTHER PUBLICATIONS

Wikipedia, "Seq2seq," Aug. 9, 2024, five pages, [Online] [Retrieved on Apr. 29, 2025] Retrieved from the Internet <URL: https://en.wikipedia.org/w/index.php?title=Seq2seq&oldid=1239430636 >.
International Search Report and Written Opinion, PCT Application No. PCT/US2025/018473, May 14, 2025, 19 pages.

* cited by examiner

*Primary Examiner* — Yicun Wu
(74) *Attorney, Agent, or Firm* — Fenwick & West LLP

(57) ABSTRACT

A computing server receives, through a message communication channel from a user, a documentation of a transaction. The computing server parses data in the documentation to create a data instance representing the transaction in a database. The computing server determines that the data instance needs an assignment of a category from a list of custom-defined categories. The computing server applies a machine-learned encoder model to features of the data instance to determine candidate categories from the list of custom-defined categories. The computing server transmits a response message to the user through the message communication channel. The response message includes at least one of the candidate categories determined by the machine learning model. Responsive to transmitting the response message to the user, the computing server receives feedback from the user. The computing server generates a category assignment for the data instance based on the user feedback.

20 Claims, 8 Drawing Sheets

AUTOMATED DATA INSTANCE ASSIGNMENT

TECHNICAL FIELD

The present disclosure generally relates to assigning categories to data instances. More specifically, the present disclosure relates to methods and systems for interactive categorization of transaction data using machine learning models and natural language processing techniques in response to user-provided documentation.

BACKGROUND

Traditional processes of submitting documentation of transactions, such as physical receipts, for accounting and categorization are often time-consuming, prone to errors, and can lead to backlogs in financial reporting and decision-making. Moreover, when documentation of a transaction is finally processed, it may be assigned to an incorrect category due to limited context or human error. Misclassification can result in inaccurate financial records and potential compliance issues. Lack of real-time interaction means that errors may go unnoticed for extended periods. Additionally, the expertise of the individual who made the transaction is not effectively utilized in this traditional approach.

SUMMARY

Embodiments are related to data assignment processes and architectures that reduce the processing and network bandwidth resource consumption by a computing server handling the data assignments. In one embodiment, a computing server receives, through a message communication channel from a user, a documentation of a transaction. The computing server parses data in the documentation to create a data instance representing the transaction in a database. The computing server determines that the data instance needs an assignment of a category from a list of custom-defined categories. The computing server applies a machine-learned encoder model to features of the data instance to determine candidate categories from the list of custom-defined categories. The computing server transmits a response message to the user through the message communication channel. The response message includes at least one of the candidate categories determined by the machine learning model. Responsive to transmitting the response message to the user, the computing server receives feedback from the user. The computing server generates a category assignment for the data instance based on the user feedback.

BRIEF DESCRIPTION OF THE DRAWINGS

Figure (FIG. 1 is a block diagram illustrating an example system environment, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
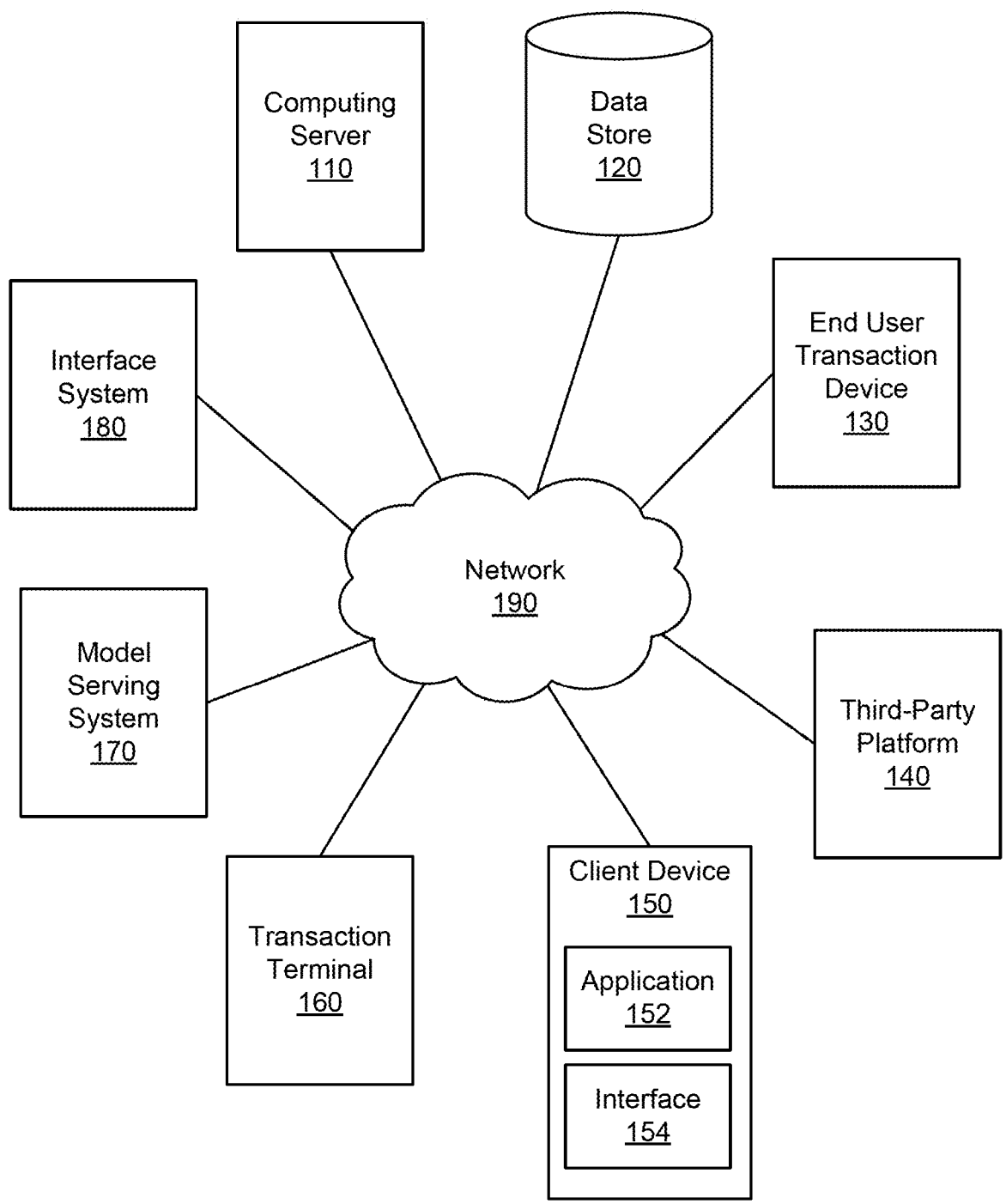

FIG. 1 is a block diagram that illustrates a transaction management system environment 100, in accordance with an embodiment. The system environment 100 includes a computing server 110, a data store 120, an end user transaction device 130, a third-party platform 140, a client device 150, and a transaction terminal 160. The entities and components in the system environment 100 communicate with each other through a network 190. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can issue multiple end user transaction devices 130 for different end users. Different client devices 150 may also access the computing server 110 simultaneously.

The computing server 110 includes one or more computers that perform various tasks related to managing accounting, payments, and transactions of various clients of the computing server 110. For example, the computing server 110 creates credit cards and accounts for an organization client, manages transactions of the cards of the organization client based on rules set by the client (e.g., pre-authorization and restrictions on certain transactions), and facilitates the annotation by the end users involved in incurring the transactions (e.g., tagging the transactions with metadata tags specified third-party bookkeeping platform schemas). Examples of organizations may include commercial businesses, educational institutions, private or government agencies, or any suitable group of one or more individuals that engage in transactions with a named entity (e.g., a merchant) using an account associated with a credit card. In some embodiments, a named entity may be an identifiable real-world entity that may be detectable in the data of an organization. For example, a specific merchant may be a named entity and a merchant may refer to an organization that provides goods or services for purchase using the end user transaction device 130.

Client organizations may use third-party platforms (e.g., third-party platform 140) as bookkeeping tools to manage the transaction data resulting from the transaction accounts created for their personnel. The third-party platforms organize transaction data using their own data structures according to a schema. Each schema may include different data fields, which may include metadata tags and annotation data fields. The annotation and organization of transaction data into third-party schemas enables transaction data to be easily queried, sorted, and filtered due to the standardized structure provided by the schemas.

An end user may be a member of an organization client such as an employee of the organization or an individual that uses the end user transaction device 130 to make a purchase from a named entity. In one embodiment, the computing server 110 provides its clients with various payment and spending management services as a form of cloud-based software, such as software as a service (SaaS). Examples of components and functionalities of the computing server 110 are discussed in further detail below with reference to FIG. 2. The computing server 110 may provide a SaaS platform for various clients to manage their accounts and transaction rules related to the accounts.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, annotation rules for metadata tags with which transactions are to be annotated, or selection criteria for determining which transactions are to be annotated and other related data associated with various clients of the computing server 110. In various embodiments, the data store 120 may take different forms. In one embodiment, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In one embodiment, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, and wearable electronic devices. The computing server 110 issues end user transaction devices 130 such as credit cards for its organization clients and may impose spending control rules and restrictions on those cards. While credit cards are often used as examples in the discussion of this disclosure, various architectures and processes described herein may also be applied to other types of end user transaction devices 130. In some cases, an end user transaction device 130 may also be a virtual device such as a virtual credit card.

A third-party platform 140 is a server that receives transaction data from multiple sources (e.g., various client organizations) and keeps data records of the transactions performed by the sources. A third-party platform may be referred to as a bookkeeping platform. Examples of bookkeeping platforms include NETSUITE, SAGE, and QUICKBOOKS. The third-party platform 140 may be operated by an entity different from the entity operating the computing server 110. Although one third-party platform is shown in FIG. 1, the computing server 110 may communicate with multiple third-party platforms. Each third-party platform may manage and maintain data records of transactions using respective schemas (e.g., data structure and fields can be unique to each third-party platform). For example, one third-party platform may store information describing a merchant category under the data field "class" while another third-party platform may store the information under the data field "group." In another example, different third-party platforms may have a different number of data fields for recording transaction data. Additional examples of third-party platforms are described in U.S. patent application Ser. No. 17/498,664, entitled "Domain-Specific Data Records Synchronization," filed Oct. 11, 2021, and is incorporated by reference herein for all purposes.

A client device 150 is a computing device that belongs to a client of the computing server 110. A client uses the client device 150 to communicate with the computing server 110 and performs various payment and spending management-related tasks such as creating credit cards and associated payment accounts, setting rules and restrictions on cards, setting pre-authorized or prohibited merchants or merchant categories (e.g., entertainment, travel, education, health, etc.), and managing transactions (e.g., requesting annotations for certain transactions using third-party platform schema data fields). The user of the client device 150 may be a manager, an accounting administrator, or a general employee of an organization. While in this disclosure a client is often described as an organization, a client may also be a natural person or a robotic agent. A client may be referred to an organization or its representative such as its employee. A client device 150 includes one or more applications 142 and interfaces 144 that may display visual elements of the applications 142. The client device 150 may be any computing device. Examples of such client devices 130 include personal computers (PC), desktop computers, laptop computers, tablets (e.g., iPads), smartphones, wearable electronic devices such as smartwatches, or any other suitable electronic devices.

The application 152 is a software application that operates at the client device 150. In one embodiment, the application 152 is published by the party that operates the computing server 110 to allow clients to communicate with the computing server 110. For example, the application 152 may be part of a SaaS platform of the computing server 110 that allows a client to create credit cards and accounts and perform various payment and spending management tasks (e.g., annotate transactions according to schemas of third-party platforms). In various embodiments, the application 152 may be of different types. In one embodiment, the application 152 is a web application that runs on JavaScript and other backend algorithms. In the case of a web application, the application 152 cooperates with a web browser to render a front-end interface 154. In another embodiment, the application 152 is a mobile application. For example, the mobile application may run on Swift for iOS and other APPLE operating systems or on Java or another suitable language for ANDROID systems. In yet another embodiment, the application 152 may be a software program that operates on a desktop computer that runs on an operating system such as LINUX, MICROSOFT WINDOWS, MAC OS, or CHROME OS.

An interface 154 is a suitable interface for a client to interact with the computing server 110. The client may communicate with the application 152 and the computing server 110 through the interface 154. The interface 154 may take different forms. In one embodiment, the interface 154 may be a web browser such as CHROME, FIREFOX, SAFARI, INTERNET EXPLORER, EDGE, etc. and the application 152 may be a web application that is run by the web browser. In one embodiment, the interface 154 is part of the application 152. For example, the interface 154 may be the front-end component of a mobile application or a desktop application. In one embodiment, the interface 154 also is a graphical user interface (GUI) which includes graphical elements and user-friendly control elements. In one embodiment, the interface 154 does not include graphical elements but communicates with the data management server 120 via other suitable ways such as application program interfaces (APIs), which may include conventional APIs and other related mechanisms such as webhooks.

In some embodiments, the client device 150 and the end user transaction device 130 belong to the same domain. For example, a company client can request the computing server 110 to issue multiple company credit cards for the employees. A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

A transaction terminal 160 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACE-BOOK PAY and WECHAT PAY, wire transfers, electronic bill payments, automated clearing house (ACH) transfer, cryptocurrency transfer, blockchain transfer, etc. Depending on the type of electronic fund transfer, a transaction terminal 160 may take different forms. For example, if an electronic fund transfer is a credit card payment, the transaction terminal 160 can be a physical device such as a point of sale (POS) terminal (e.g., a card terminal) or can be a website for online orders. An ATM, a bank website, a peer-to-peer mobile application, and an instant messaging application can also be examples of a transaction terminal 160. The third party is a transferor or transferee of the fund transfer. For example, in a card transaction, the third party may be a named entity (e.g., a merchant). In an electronic fund transfer such as a card payment for a merchant, the transaction terminal 160 may generate a transaction data payload that carries information related to the end user transaction device 130, the merchant, and the transaction. The transaction data payload is transmitted to other parties, such as credit card companies or banks, for approval or denial of the transaction.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., cloud computing, distributed computing, or in a virtual server network). In one embodiment, a server includes one or more virtualization instances such as a container, a virtual machine, a virtual private server, a virtual kernel, or another suitable virtualization instance.

In some embodiments, language models used by the computing server 110 to analyze data are large language models (LLMs) that are trained on a large corpus of training data to generate outputs for the natural language processing (NLP) tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has a significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the computing server 110 or entities/systems different from the computing server 110. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

The model serving system 170 receives requests from the computing server 110 to perform inference tasks using machine-learned language models. The inference tasks include, but are not limited to, NLP tasks, audio processing tasks, image processing tasks, video processing tasks, and the like. In some embodiments, the machine-learned language models deployed by the model serving system 170 are models configured to perform one or more NLP tasks. The NLP tasks include, but are not limited to, text generation, query processing, machine translation, chatbot applications, and the like. In some embodiments, the language model is configured as a transformer neural network architecture. Specifically, the transformer model is coupled to receive sequential data tokenized into a sequence of input tokens and generates a sequence of output tokens depending on the inference task to be performed.

The model serving system 170 receives a request including input data (e.g., text data, audio data, image data, transaction data, or video data) and encodes the input data into a set of input tokens. The model serving system 170 applies the machine-learned language model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represent a translation of the paragraph or sentence in English. For a text generation task, the transformer model may receive a prompt and continue the conversation or expand on the given prompt in human-like text.

When the machine-learned language model is a language model, the sequence of input tokens or output tokens is arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like.

In some embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While an LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In some embodiments, the inference task for the model serving system 170 can primarily be based on reasoning and summarization of knowledge specific to the computing server 110, rather than relying on general knowledge encoded in the weights of the machine-learned language model of the model serving system 170. The domain-specific knowledge and information may be provided by an interface system 180. One type of inference task may be to perform various types of queries on large amounts of data in an external corpus in conjunction with the machine-learned language model of the model serving system 170. For example, the inference task may be to perform question-answering, text summarization, text generation, and the like based on information contained in the external corpus.

The interface system 180 provides the search to the model serving system 170. By contrast, entering domain-specific knowledge data manually can be time-consuming. A system that creates a context for the intent and fills it in with data from all known systems can produce a very rich query or combination of queries to stitch together for rich information returns. The interface system 180 is used to manage complex queries for the model serving system 170 to provide rich information returns. The interface system 180 additionally manages the processing of query results from the systems contained in the model serving system 170.

In various embodiments, the functionalities and components described herein may be distributed among computing server 110, model serving system 170, and interface system 180. For example, in some embodiments, any NLP tasks may be performed by the model serving system 170, including analyzing the intention, and providing a response. In some embodiments, the computing server 110 may perform the intent inference and provide the inferred intent to the model serving system 170 to generate responses. In some embodiments, the computing server 110 may provide transaction data to the interface system 180 as training data and response data on which the model serving system 170 is based. In some embodiments, the model serving system 170 may be operated by a different entity than the computing server 110. In some embodiments, the computing server 110 may fine tune a machine-learned language model provided by the model serving system 170. In some embodiments, the computing server 110 may train and store its own machine-learned language model.

The network 190 provides connections to the components of the system environment 100 through one or more sub-networks, which may include any combination of local area and/or wide area networks, using both wired and/or wireless communication systems. In one embodiment, a network 190 uses standard communications technologies and/or protocols. For example, a network 190 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 190 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 190 may be represented using any suitable format, such as hypertext markup language (HTML), extensible markup language (XML), JavaScript object notation (JSON), and structured query language (SQL). In some embodiments, some of the communication links of a network 190 may be encrypted using any suitable technique or techniques such as secure sockets layer (SSL), transport layer security (TLS), virtual private networks (VPNs), Internet Protocol security (IPsec), etc. The network 190 also includes links and packet switching networks such as the Internet. In some embodiments, a data store belongs to part of the internal computing system of a server (e.g., the data store 120 may be part of the computing server 110). In such cases, the network 190 may be a local network that enables the server to communicate with the rest of the components.

Example Server Components

Figure 2:
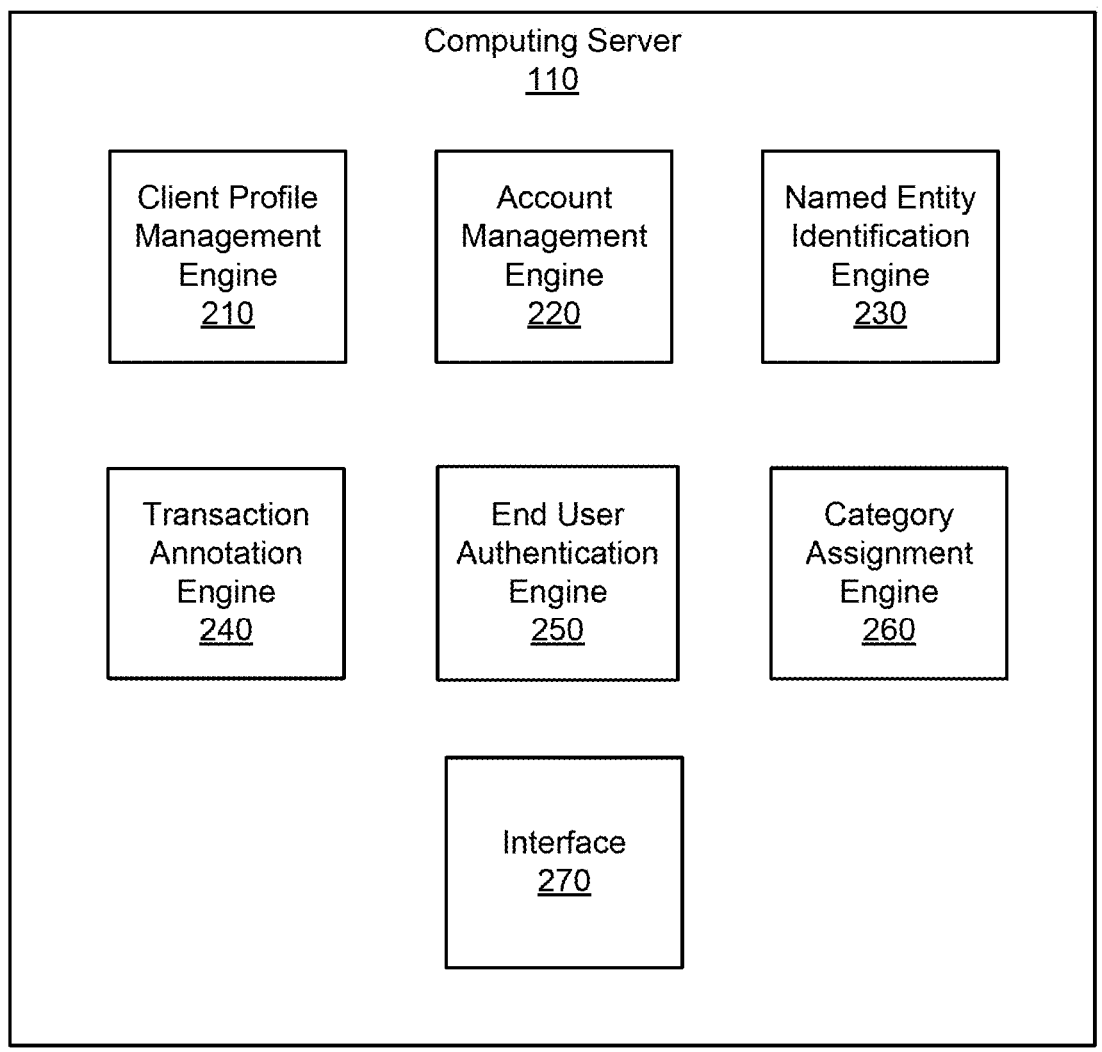
FIG. 2 is a block diagram illustrating components of an example computing server, in accordance with an embodiment.

FIG. 2 is a block diagram illustrating components of a computing server 110, in accordance with an embodiment. The computing server 110 includes a client profile management engine 210, an account management engine 220, a named entity identification engine 230, a transaction annotation engine 240, an end user authentication engine 250, a category assignment engine 260, and an interface 270. In various embodiments, the computing server 110 may include fewer or additional components. For example, in some embodiments, the computing server 110 may also include a transaction approval server. The functions of various components may be distributed in a different manner than described below. Moreover, while each of the components in FIG. 2 may be described in a singular form, the components may be present in plurality. The components may take the form of a combination of software and hardware, such as software (e.g., program code comprised of instructions) that is stored on memory and executable by a processing system (e.g., one or more processors).

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of a client to determine the administrative privilege of an employee in creating a credit card account and in setting transaction rules, selection criteria for annotating transactions, and annotation requirements. An administrator of the client may specify that certain employees from the financial department and managers have the administrative privilege to create cards for other employees.

The client profile management engine 210 may organize or categorize transaction data of an organization client according to metadata tags (e.g., the annotation requirements specified by the organization client). The metadata tags can include tags specified by a third-party platform, create tags (e.g., tags for transaction types, merchants, date, amount, card, employee groups, etc.), or a combination thereof. The client profile management engine 210 may process transactions on behalf of an organization client by generating and organizing the transaction data of the transactions into a data structure. Each entry of the data structure may correspond to a transaction. The fields of the data entries can include the metadata tags. The client profile management engine 210 can annotate a data entry by storing values in the fields of the data entries. For example, the client profile management engine 210 annotates a data entry with values of data fields of a third-party platform's schema by storing the values in fields of the data entry assigned to the schema's data fields. The client profile management engine 210 may use a common or standardized data structure format for organizing the transaction data of a client. This standardized format may enable different third-party platforms' schema to be standardized within a single data structure. For example, a single client may use two different bookkeeping platforms. Each of the bookkeeping platforms can use the same data field name or different data field names across their different schemas (e.g., one platform uses "category" and another uses "group"). The client profile management engine 210 may maintain a mapping of different data field names that refer to the same characteristic of transaction data, and use the mapping when creating or updating a data entry with transaction data or user-provided annotations. In this way, the computing server 110 can receive annotation for various schemas and organize the annotation into a common format for organizing transaction data agnostic of the third-party platform used for annotating the transaction data.

The client profile management engine 210 can monitor the spending of a client by category and also by the total spending. The spending amounts may affect the results of transaction rules and selection criteria for annotating transactions that are specified by an organization client's administrator. For example, a client may limit the total monthly spending of an employee group. The computing server 110 may deny further card payments after the total spending exceeds the monthly budget.

The account management engine 220 creates and manages accounts including payment accounts such as credit cards that are issued by the computing server 110. An account is associated with an end user such as an employee and corresponds to a card or an end user transaction device. A client may use the computing server 110 to issue domain-specific payment accounts such as company cards. The client enters account information such as the cardholder's name, role and job title of the cardholder in the client's organization, limits of the card, and transaction rules associated with the card. The client may use the client device 150 and the interface 154 to supply this information to the computing server 110. In response to receiving the account information (e.g., from the client device 150), the account management engine 220 creates the card serial number, credentials, a unique card identifier, and other information needed for the generation of a payment account and corresponding card. The account management engine 220 associates the information with the cardholder's identifier. The computing server 110 communicates with a credit card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110. The cards and payment accounts created are associated with the transaction rules, selection criteria for annotating transactions, and/or annotation requirements that are specified by the client's administrator.

In some embodiments, the account management engine 220 creates and stores selection criteria that specify annotations are required for transaction data that meet the selection criteria. A client may provide to the computing server 110 criteria under which transactions are to be annotated by the computing server 110. The client may use the interface 154 of the client device 150 to specify the criteria. Examples of selection criteria can include a transaction amount, a transaction location, a transaction date, a third-party named entity category, a third-party named entity name, any suitable parameter related to a transaction, or a combination thereof. In one example of a rule, the client specifies that an annotation is required for transaction amounts above seventy-five dollars. In another example of a rule, the client specifies that annotations are not required for transactions incurred with a particular merchant. In some embodiments, the account management engine 220 may recommend selection criteria to a client based on a history of selection criteria used by clients that share similar characteristics (e.g., industry type, number of employees, card transaction rules, etc.). The client may specify priority for criteria such that a certain criterion may override another criterion. For example, the account management engine 220 may determine that, under the previous two examples of criteria, the client has specified that rules for requiring annotations override rules for not requiring annotation, and cause the transaction annotation engine 240 to request an annotation for, for example, a transaction made with the particular merchant that was over seventy-five dollars.

Upon determining whether the annotation is needed using the selection criteria created by the account management engine 220, the transaction analysis engine 240 may annotate or flag a record of the transaction with an indicator that the transaction is unannotated and whether it needs to be annotated. This indicator may be used when generating a user interface for the client when managing annotation statuses of past transactions. The selection criteria may be different for each cardholder, each cardholder program (e.g., multiple cardholders sharing one or more characteristics specified by a client can be grouped into a program), or each client. In this way, for example, a client can customize which transactions are to be annotated rather than apply a single rule for employees in different groups who may use the cards in different ways. A client may establish such rules through an interface generated by the interface 250.

The account management engine 220 creates and stores annotation requirements regarding which data fields (e.g., metadata tags) are required for annotating the transaction data that meets the selection criteria. The data fields can include data fields of a third-party platform. Different third-party platforms may have different schemas (e.g., different permutations of data fields) for organizing transaction data. The account management engine 220 may receive data fields from third-party platforms and receive annotation requirements from clients specifying which third-party platform and schema to use for the transaction accounts of the client. A single client may use one or more third-party platforms, and the account management engine 220 may maintain a record of which third-party platforms are used for which of the transaction accounts of the client. The account management engine 220 can receive one or more selection criteria from an organization client (e.g., via the interface 154).

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspellings. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transactions. In one embodiment, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with the payloads of a particular named entity. The named entity identification rule may specify, for example, the location of a string, the prefix or suffix to be removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads.

The transaction annotation engine 240 annotates transactions incurred between third-party named entities and transaction accounts of clients. The transaction annotation engine 240 may identify transactions that need to be annotated based on selection criteria stored in the account management engine 220. The transaction annotation engine 240 can identify an end user who is responsible for annotating the identified unannotated transaction. The transaction annotation engine 240 may send requests to responsible end users to annotate the transactions. After receiving an annotation from a responsible end user, the transaction annotation engine 240 may create annotated transaction data entries. In one example of creating an annotated transaction data entry, the transaction annotation engine 240 may store values provided by the user for annotation into a data entry for the corresponding unannotated transaction. The data entry may include fields for annotation (e.g., data fields of a third-party platform's schema for annotating transactions). By identifying unannotated transactions that need to be annotated, identifying end users to annotate the transactions, and requesting the end users to annotate the transactions, the transaction annotation engine 240 enables the computing server 110 to maintain a database of transaction data that is up to date with metadata tags for organizing transactions for clients. In particular, different clients may use different sets of metadata tags for annotation. For example, different clients may use different bookkeeping platforms to organize transactions made by employees. The transaction annotation engine 240, by using the annotation requirements that specify which annotation tags the different clients, cardholders, or programs of cardholders can use, enables the computing server 110 to conserve processing resources at the computing server 110 by distributing the annotation task to end users. For example, rather than the computing server 110 determining annotation information in varying schemas for tens of thousands of transactions by end users daily, the computing server 110 generates user interfaces that guide the end users to properly annotate transaction information according to an appropriate schema for their client organization or transaction account. In this way, the computing server 110 can reduce processing resources generating a user interface at a much smaller scale (e.g., ten of the same interfaces) than processing tens of thousands of different transactions daily.

The transaction annotation engine 240 can access one or more selection criteria stored in the account management engine 220. A selection criterion may specify transactions that need to be annotated. The transaction annotation engine 240 may traverse transactions (e.g., traversing entries in a data structure of transaction data) and determine one or more of the transactions that need to be annotated according to the selection criteria. For example, the selection criteria specify that transactions for a particular group of cardholders (e.g., a cardholder program) need to be annotated if they are made with merchants that provide subscription services (e.g., reoccurring transactions made using the same transaction account). The computing server 110 may identify reoccurring transactions, example methods for which are discussed in further detail in the U.S. patent application Ser. No. 17/390,701, entitled "User Interface for Recurring Transaction Management," filed Jul. 30, 2021, and is incorporated by reference herein for all purposes. The transaction engine 240 may then flag the transactions that meet the selection criteria as unannotated transactions that need annotations.

The transaction annotation engine 240 can request end users of the transaction accounts used to incur the unannotated transactions to annotate the unannotated transactions. To request that end users annotate the unannotated transactions, the transaction annotation engine 240 can identify end users responsible for annotating the transactions and transmit a direct link to those responsible end users. To identify a responsible end user, the transaction annotation engine 240 can query for a user identifier to contact the responsible user using the transaction account (e.g., an account number associated with the transaction account). In one example, the client profile management engine 210 can be queried by the transaction annotation engine 240 using an account number to determine a profile that maps a user identifier (e.g., email address, phone number, or SaaS platform user name) to the account number. The transaction annotation engine 240 can generate a direct link that can bring the responsible end user to an annotation page to annotate one or more transactions.

The transaction annotation engine 240 can transmit a direct link to responsible end users through one or more communication channels. Examples of communication channels include an email service, a short message service (SMS), or a website hosted by the computing server 110. The transaction annotation engine 240 may transmit a request to a third-party application service (e.g., FIREBASE) to generate a direct link and receive the direct link from the third-party application service. In some embodiments, the direct link may cause a web browser to directly land on a webpage that is used for the annotation without further selection by the responsible end user on the transactions. In some embodiments, the direct link may land the user on an annotation webpage without further verification or authentication. For example, the user may not need to provide login credentials before accessing the annotation webpage through the direct link. The annotation webpage may be specific to the particular responsible end user and may automatically match the particular transaction that needs to be annotated. The webpage includes user input fields for the responsible user to provide annotation data field values. This webpage may be referred to as an annotation webpage. The annotation webpage can be specific to a particular transaction so that the user input fields for annotation may be used by the transaction annotation engine 240 to fill a data entry that corresponds to a specific transaction. The user input fields of the annotation webpage may be generated according to annotation requirements for the responsible end user or the transaction.

In some embodiments, the transaction annotation engine 240 may request that a responsible end user annotate a transaction without a direct link. An example of using SMS to request a user annotate a transaction is shown in FIGS. 5A-5B and 6. The transaction annotation engine 240 directly prompts the user to supply annotation data field values using questions. A question may be associated with a particular data field that is required to be annotated according to a client's annotation requirements. Before or while providing the request for an end user to annotate an unannotated transaction, the transaction annotation engine 240 may instruct the end user authentication engine to verify the identity of the end user. The transaction annotation engine 240 may verify the identity before receiving an annotation from the user and creating an annotated data entry.

The transaction annotation engine 240 may receive, from the end users, annotations of the unannotated transactions. In some embodiments, one or more annotations include data field values of a third-party platform's schema. An end user may provide annotations using a device and a communication channel (e.g., email, SMS, or SaaS platform website). The computing server 110 may provide a user interface for the end user to provide the annotations. In some embodiments, the transaction annotation engine 240 may receive different annotations for end users of different organization clients. Those organization clients may use different third-party platforms. Accordingly, the received annotations may have different data field values corresponding to schemas used by the different third-party platforms.

The end user authentication engine 250 may verify the identity of an end user that is annotating a transaction. The end user authentication engine 250 may execute a multi-factor authentication (MFA) process with an end user. In response to the end user successfully completing the MFA process, the end user authentication engine 250 may generate a token that includes authentication information and store the token on a device of the end user. The end user authentication engine 250 may encrypt the token and store the encrypted token on the device. In one example of creating and storing an encrypted token, the end user authentication engine 250 creates an encrypted Hypertext Transfer Protocol (HTTP) cookie using Advanced Encryption Standard (AES) 256 and stores the encrypted HTTP cookie at a web browser application of the end user's device. Other token and encryption methods may be used to create and store tokens carrying authentication information (e.g., JSON Web Token (JWT)). The authentication information stored in a token may include a date/time on which the token is created, an identifier of the end user's device (e.g., device class such as tablet or smartphone), or an identifier of the end user (e.g., the end user's name). Each token may have an expiration date that can be calculated using the date/time on which the token was created. By storing an encrypted token on the user's device, the computing server 110 may use the encrypted token to authenticate the user without requiring the user to provide login credentials to annotate transactions.

In one example of authenticating an end user, the end user authentication engine 250 accesses the encrypted token stored in the end user's device in response to the end user selecting a direct link. The end user authentication engine 250 then decrypts the encrypted token to obtain authentication information of the end user and determines that the token has not expired based on a creation date included in the authentication information. In response to determining the token has not expired, the end user authentication engine 250 verifies the identity of the end user using the direct link and the authentication information. In some embodiments, if the identity of the user cannot be verified using the encrypted token, the end user authentication engine 250 may prompt the user to provide login credentials (e.g., perform an MFA process).

The category assignment engine 260 may provide automated data instance categorization. For example, the category assignment engine 260 may retrieve a list of custom-defined categories from a database maintained by a third-party platform. These categories may be unique to each customer or may be a list of default categories provided by the third-party platform. The categories may be determined by the customer who uses the third-party platform. The category assignment engine 260 may access training samples to train a machine-learned encoder model. Each training sample may include a positive data instance, which belongs to a target category on the list of custom-defined categories, and a negative data instance that exists outside the target category.

A data instance may correspond to transaction data, which may need to be categorized. For example, a data instance may include data about a company's expenditure or transaction, such as the transaction amount, the type of expense (e.g., office supplies, travel, entertainment), the origin of the transaction (credit card, bank transfer, cash), associated user or department, contextual information (e.g., date, location, or associated project), and/or receipt data. The category assignment process described in the present disclosure may provide significant advantages in managing, tracking and analyzing data (for e.g., financial data) and may automate tasks such as expense reporting, budgeting, and audit preparation.

The category assignment engine 260 may receive a target data instance that is slated to be imported to the third-party data platform. This target data instance may undergo a process of feature generation by the category assignment engine 260 to prepare it for additional processing. The trained machine-learned encoder model may receive the target data instance as input. The trained machine-learned encoder model may output a category data for the data instance. The machine-learned encoder model may assign a category to each data instance based on patterns it learnt during its training phase. For example, the machine-learned encoder model may be trained by the category assignment engine 260 to distinguish between embeddings of data instances of a given category and those that exist outside of it. In some embodiments, the computing server 110 may assign a category to a target data instance from a list of custom-defined categories, examples of which are discussed in further detail in the U.S. patent application Ser. No. 18/671,914, entitled "Automated Data Instance Assignment and Integration," filed May 22, 2024, and is incorporated by reference herein for all purposes.

The interface 270 includes interfaces that are used to communicate with different parties and servers. The interface 270 may take the form of a SaaS platform that provides clients with access to various functionalities provided by the computing server 110. The interface 270 provides a portal in the form of a GUI for clients to create payment accounts, manage transactions, specify the rules of each card, and annotate transactions incurred using the cards. The interface 270 is in communication with the application 152 and provides data to render the application 152. The interface 270 may be in communication with a third-party platform (e.g., the third-party platform 140) to export transaction data to the third-party platform. For example, the computing server 110 may use the interface 270 to provide transaction data to the third-party platform 140 in batches by providing the data structure of transactions for a client in a file format suitable for the data structure (e.g., a spreadsheet file). The interface 270 may provide a portal for display that shows annotated transaction data that includes annotation provided by end users (e.g., data field values of third-party platforms' schemas). The portal may include a GUI element that allows a user to export the annotated transaction data to a third-party platform. The interface 270 may generate a portal of annotated transaction data that can be sorted according to schemas used to annotate the transactions.

In some embodiments, the interface 270 may generate annotation webpages for an end user to provide annotation for an unannotated transaction. The interface 270 may generate different annotation webpages for different end users. For example, different users may be subjected to different annotation requirements and thus, the annotation webpages can include different input elements for the different annotation requirements. The annotation requirements may be different due to a client specifying different data fields of the same schema required for different transaction accounts. The annotation requirements may be different due to differences in schemas of third-party platforms. The interface 270 may use a communication channel such as SMS, email, or SaaS platform website to communicate with end users or administrators of clients.

In one embodiment, the interface 270 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of annotating transactions, and other functionalities of the various engines 210, 220, 230, 240, 250 and 270 may be changed by the clients through sending commands to the API.

Example Process for Automated Data Instance Assignment

Figure 3:
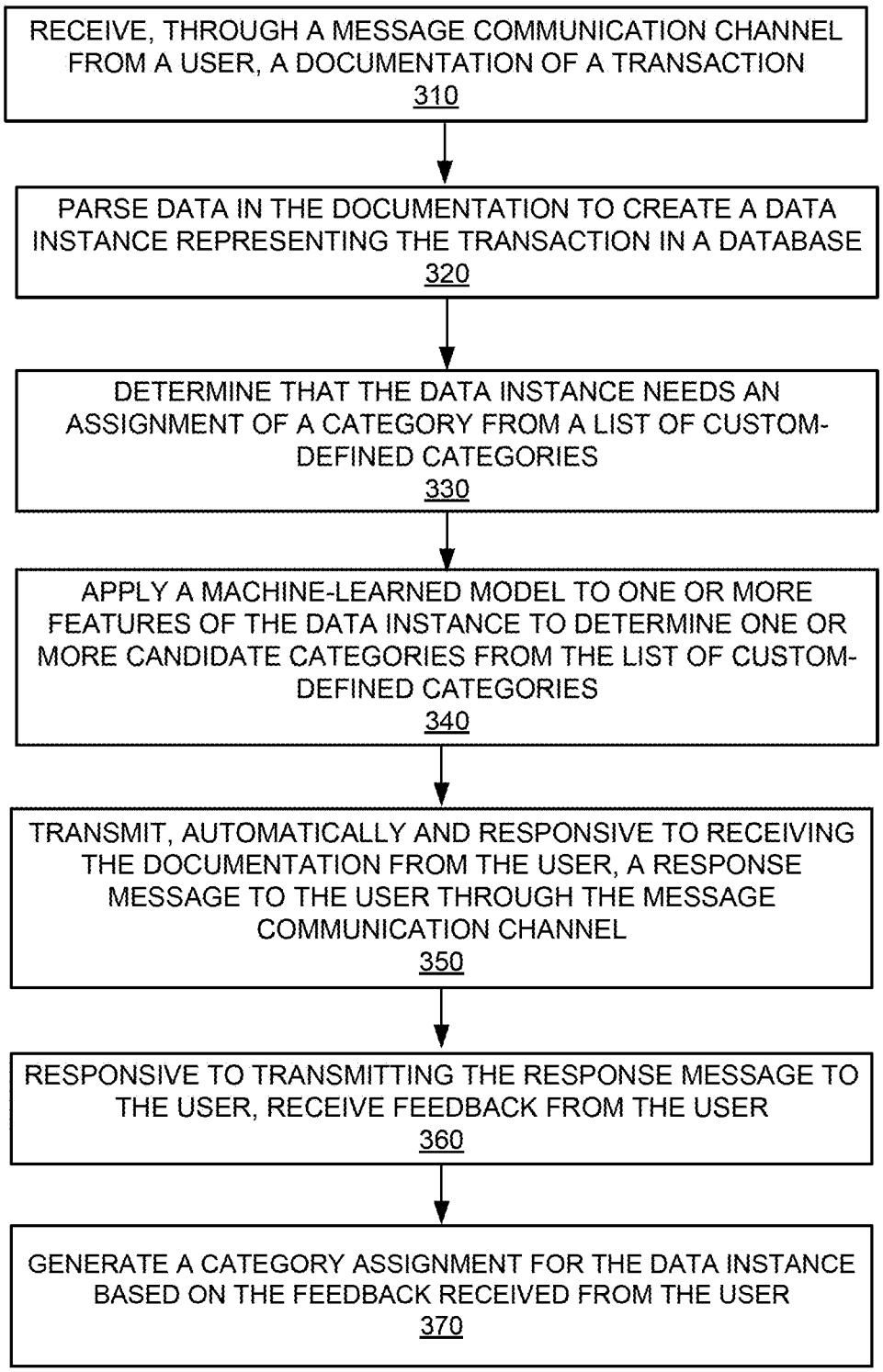
FIG. 3 is a flowchart depicting an example process, in accordance with an embodiment.

FIG. 3 is a flowchart depicting an example process 300 for automated data instance assignment, in accordance with some embodiments. The process may be performed by the category assignment engine 260 or any other engine of the computing server 110 illustrated in FIG. 2. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 110, each step may be performed by a different computing device.

In some embodiments, the computing server 110 may receive 310, through a message communication channel from a user, a documentation of a transaction. The documentation may be an image of a physical document. The message communication channel may be a SMS, an email, or a SaaS platform. For example, a user may capture a picture of a receipt using the client device 150 and send the captured picture to the computing server 110 via SMS, streamlining the process of documenting and submitting transaction information. Upon receiving the transaction documentation from the user, the computing server 110 may store it in the data store 120. By storing the documentation in the data store 120, the computing server 110 may provide that the transaction information is securely saved and readily accessible for further processing and analysis.

Continuing with reference to FIG. 3, in some embodiments, the computing server 110 may parse 320 data in the documentation to create a data instance representing the transaction in a database. The parsing process may include extracting relevant information from the documentation, such as the transaction amount, date, merchant name, and other pertinent details. For image-based documentation like an image of a receipt, this may include using optical character recognition (OCR) technology to convert the image text into machine-readable data. The extracted information may be organized into a standardized format, creating a data instance that represents the transaction. The data instance may be stored within the data store 120 for easy retrieval, analysis, and integration with other financial data. By converting the raw documentation into a structured data instance, the computing server 110 may provide efficient processing and categorization of the transaction information.

In some embodiments, the computing server 110 may apply a natural language generation (NLG) process to identify information within the documentation for creating the data instance. This process may provide understanding and processing unstructured or semi-structured text within the documentation, such as descriptions or notes on the receipt. The NLG process may analyze the text, identifying key elements like transaction type, merchant details, or specific items purchased. It may recognize patterns, context, and relevant information presented in varied formats. These features provide the computing server 110 to accurately extract pertinent details from a wide range of documentation styles, including handwritten notes or non-standard receipt formats. The identified information may be used to create a data instance representing the transaction, providing that all relevant details are captured for further processing and categorization.

Continuing with reference to FIG. 3, in some embodiments, the computing server 110 may determine 330 that the data instance needs an assignment of a category from a list of custom-defined categories. This determination may be based on predefined criteria or rules set within the computing server 110. For example, the computing server 110 may identify the data instance as a new transaction without historical categorization, detect an absence of a category label, or respond to a specific user request for category assignment. The need for categorization may also be triggered by certain transaction attributes, such as the amount exceeding a threshold or the merchant being unfamiliar. The categories considered for assignment may come from a list of custom-defined categories, which are typically tailored to the organization's specific needs and accounting practices. These features may prepare the transaction data for proper financial management, reporting, and analysis.

In some embodiments, the computing server 110 may retrieve a list of custom-defined categories of a database maintained by a third-party platform. The list of custom-defined categories may be defined by an entity (or user) who uses the third-party data platform. Custom-defined categories may be user-defined groupings created according to specific needs, preferences, or contexts. These categories may provide a flexible framework for users to structure and organize their data, information, or items.

Continuing with reference to FIG. 3, in some embodiments, the computing server 110 may apply 340 a machine-learned encoder model to one or more features of the data instance to determine one or more candidate categories from the list of custom-defined categories.

In some embodiments, the computing server 110 may train the machine-learned encoder model to separate a plurality of embeddings of positive data instances that belong to a target category from a plurality of embeddings of negative data instances. The embedding may be an embedding vector located in a latent space of the machine-learned encoder model. The latent space may be one of the spaces in a hidden layer of the machine-learned encoder model. The computing server 110 may train the machine-learned encoder model by using training samples.

The training samples may contain various data instances that fit into defined categories, as well as data instances that fall outside these categories. Each training sample may include two types of data instances, positive and negative. A positive data instance is an example that belongs to a target category. The target category may be one of the categories from the list of custom-defined categories. This positive data instance may serve as the correct or desired example during model training. It may represent the type of data that the machine-learned encoder model is expected to classify into the target category. A negative data instance is an example that lies outside of the target category. In other words, it may be an example that does not meet the criteria to be classified under the target category, thus serving as an undesirable example during training. This negative data instance may provide contrast and allow the machine-learned encoder model to learn the differences between data that should and should not be classified under a target category. The computing server 110 may access the plurality of training samples by retrieving them from a database of a third-party platform and/or storing the training samples in the database of the third-party platform. The computing server 110 may make the training samples available to the machine-learned encoder model.

The machine-learned encoder model can be trained to generate the embeddings such that it can effectively separate the positive data instances from the negative ones in the embedded space. This may be achieved via a process of optimization, using a loss function that promotes holding similar embeddings closer for positive data instances and pushing away embeddings for negative data instances. These losses may guide how the model adjusts its internal parameters to improve its categorization accuracy. Once the machine-learned encoder model is trained, it can take a new data instance, generate an embedding for it, and determine which category it should be assigned to by measuring the distance from the embeddings of each category's positive data instances.

In some embodiments, the computing server 110 may train the machine-learned encoder model by initializing the machine-learned encoder model with predetermined parameters, defining a loss function that calculates a relationship between embeddings of anchor, positive and negative data instances, training the machine-learned encoder by processing each training sample to generate embeddings using the loss function, and evaluating the training of the machine-learned encoder.

For example, the training process may begin with the initialization of the machine-learned encoder model with predetermined parameters. The choice of the initial parameters may affect the model's ability to learn effectively. Initialization of the machine-learned encoder model may include setting all initial parameters to zero or assigning them with random values.

In some embodiments, the computing server 110 may initialize the machine-learned encoder model with the predetermined parameters by defining an architecture of embedded spaces where data instances are mapped and defining data flow through the layers of the machine-learned encoder model from input to embedded output. The architecture may include multiple layers, each laying performing a particular operation on data instances. For example, the first step in initializing the machine-learned encoder model is defining its architecture such as the structure of the encoder model. The architecture may include the embedded spaces where data instances are mapped. This architecture may also include numerous layers, such as input layers, hidden layers, and output layers. Each layer may include many computational units or nodes called neurons in a neural network context. These layers are interconnected, allowing for data transformation and learning. The architecture may determine how many nodes are in each layer, how these nodes are connected, and what activation function each node will use. The nodes may provide a map for how inputs are transformed into outputs within the model. For example, a simple architecture may include just an input and output layer, whereas a deep learning model may have multiple hidden layers between the input and output layers.

The data flow through the layers of the machine-learned encoder model, from input to the embedded output may be defined. Defining the data flow may dictate how information is propagated forward when making predictions (forward pass) and backward when learning from errors (backpropagation). In some cases, data flows forward through the network, starting from the input layer, moving through the hidden layers as transformations are applied, and reaching the output layer to generate the final output (embedding in this case). During this forward pass, the machine-learned encoder model may use some parameters (e.g., weights and biases) to calculate the output. In some cases, after a forward pass, the model may use the calculated output and the actual output to calculate the error (loss). This error may then be propagated backward through the model (a process called backpropagation), adjusting the parameters slightly to reduce the error, hence learning.

Next, the machine-learned encoder model may define a loss function. This function may be used to train the machine learning encoder model, as it provides a measure of how well the model is performing, or in other words, how much loss it is experiencing. The loss function may compute a relationship between the embeddings of anchor data instances, positive data instances, and negative data instances. For example, the loss function may be a triplet loss function. The triplet loss function may provide positive data instances (inputs that are similar to the anchor) closer in the embedding space, while negative data instances (inputs that are dissimilar to the anchor) farther apart.

In some embodiments, the computing server 110 may define the loss function that calculates a relationship between embeddings of anchor, positive and negative data instances by defining a triplet loss function to minimize the relative distance between embeddings of positive data instances and maximize the relative distance between embeddings of negative data instances.

In some embodiment, the loss function may measure distances for a plurality of embedding pairs. Each embedding pair may include at least one of the positive embeddings and one of the negative embeddings. The distance for each embedding pair may measure a distance between the one of the positive embeddings and one of the negative embeddings. In some embodiment, the computing server 110 may backpropagate the loss function through the machine-learned encoder model. For example, the loss function may measure the disparity between the model's predictions and the actual data. The loss function may provide a numerical representation of how far off the model's output is from the expected result. This discrepancy is called the loss. Backpropagation may use this loss value to adjust the model. It may work backwards through the model from the final layer to the first layer, hence the term backpropagation. It may calculate the gradient of the loss function with respect to each parameter (essentially how much the loss changes with a change in that parameter). The model may then use this gradient to adjust the parameters in a way that makes the model more accurate. The computing server may adjust one or more parameters of the machine-learned encoder model through the backpropagation. The loss function may measure how well the machine-learned encoder model is currently performing, with lower loss values indicating better performance.

The triplet loss function may use three distinct data instances: an anchor data instance (A), a positive data instance (P) of the same category as the anchor data instance, and a negative data instance (N) of a different category.

The triplet loss function provides that a generated embedding of an anchor data instance is closer to the generated embedding of a positive data instance (which belongs to the same category as the anchor) than it is to the generated embedding of a negative data instance (which belongs to a different category). To achieve this, it tries to minimize the distance between the embeddings of the anchor and the positive data instances and maximize the distance between the embeddings of the anchor and the negative data instances.

The training of the machine-learned encoder model may include processing each training sample to generate embeddings using the defined loss function. The training sample includes an anchor data instance, a positive data instance, and a negative data instance. The model may learn from this data by adjusting its parameters to minimize the output of the loss function. In other words, it may learn to generate embeddings such that positive data instances are closer to the anchor, and negative data instances are further away from the anchor in the embedding space.

Once the machine-learned encoder model has been trained, the model's performance may need to be evaluated. The evaluation process may include a separate dataset, referred to as a validation set. The performance of the machine-learned encoder model may be assessed by feeding the validation set into the model's input and comparing the model's outputs to the actual values of the validation set. The overall loss from the machine-learned encoder model across the validation set may then be measured. Lower loss values indicate that the model is more accurate in producing embeddings that conform to the desired relationships (as defined by the loss function).

In some embodiments, the computing server 110 may evaluate the training of the machine-learned encoder by applying a validation dataset to the machine-learned encoder model, determining a metric for the machine-learned encoder model categorizing new data instances correctly through a comparison of model-predicted categories and actual categories. The validation dataset may include a plurality of data instances representing diverse categories from a list of custom categories. The metric may measure a performance of the model in minimizing the calculated loss function. The validation dataset that represents a diverse set of categories from a list of custom categories may be applied to the machine-learned encoder model. The role of this validation step is to test the model's ability to generalize its learning to unseen data instances, thereby giving an indication of how well the model will perform with real-world data that it has not been trained on.

To measure how well the machine-learned encoder model is performing, a suitable performance metric may be established. The metric may measure the model's ability to minimize the calculated loss function. The lower the value of this metric, the better the model is assumed to be performing, as a lower value indicates that the function's output is getting close to the target output. To further assess the performance of the machine-learned encoder model, new data instances may be inputted into the model. For example, these data instances may be categorized based on the trained model, and the results (model-predicted categories) may be compared with the actual categories of these data instances. Discrepancies between predicted and actual categories may provide insightful feedback on the accuracy of the trained model. A high level of accuracy, characterized by a majority of data instances being categorized correctly, provides that the model has been well trained and is likely to perform reliably with new, real-world data.

In some embodiments, the computing server 110 may apply the machine-learned encoder model to the features of the data instance by providing these features to the machine-learned encoder model. In response, the machine-learned encoder model may generate embeddings. The machine-learned model may compare these embeddings with embeddings learned during training. This comparison may provide the machine-learned encoder model to assign a category to the data instance.

In some embodiments, the computing server 110 may apply the machine-learned encoder model to the data instance by feeding its extracted features into the model. In response, the machine-learned encoder model may generate embeddings. The machine-learned encoder model may compare these newly generated embeddings with the embeddings of various categories it learned during its training phase. This comparison can include measuring the distance or similarity between the new transaction's embedding and the embeddings representing different categories. The category whose embedding is most similar (or closest in the latent space) to the new transaction's embedding is assigned to the data instance. This approach may provide for nuanced categorization that can capture subtle distinctions between transaction types. This can lead to more accurate and consistent category assignments.

Continuing with reference to FIG. 3, in some embodiments, the computing server 110 may transmit 350, automatically and responsive to receiving the documentation from the user, a response message to the user through the message communication channel, wherein the response message comprises at least one of candidate categories determined by the machine learning model.

In some embodiments, the computing server 110 may use an NLG process to create a user-friendly response message for the user. This process can take the structured data of the transaction instance and its assigned category as input and transforms it into coherent, human-readable sentences. The NLG process may analyze the elements of the transaction, such as amount, date, merchant, and assigned category, and generate grammatically correct and contextually appropriate sentences to summarize this information. For example, it might generate a message like "Your purchase of $50.00 at Coffee Shop on June 15th has been categorized as 'Dining Out'." This feature may provide the system to communicate complex data in a clear, concise manner that is easily understood by the user, which lead to improved user experience and quick categorization verification.

After generating the response message, the computing server 110 may transmit it back to the user through the same message communication channel that was used to receive the original documentation. By using the same channel, the computing server 110 provides a consistent and familiar communication flow for the user. The message can be sent automatically after the categorization process, providing near real-time feedback. This immediate response may provide users to quickly review and confirm the transaction details and category assignment while the information is still fresh in their minds. The use of the original communication channel also maintains the context of the conversation, making it easier for users to associate the response with their initial submission and take any necessary follow-up actions.

Continuing with reference to FIG. 3, in some embodiments, the computing server 110 may receive feedback from the user responsive to transmitting the response message to the user. This feedback mechanism may provide users to confirm, reject, or modify the assigned category. Users may respond through the same communication channel, providing a seamless interaction experience. For example, a user may reply with "Correct" to confirm the category, or "Change to Entertainment" to suggest a different category. This feature may provide a collaborative categorization process, leveraging both the machine learning model's predictions and the user's specific knowledge of their transactions. By incorporating user feedback, the system may improve its accuracy over time, learn from edge cases, and adapt to user-specific categorization preferences.

Continuing with reference to FIG. 3, in some embodiments, the computing server 110 may generate a category assignment for the data instance based on the feedback received from the user. In response to user feedback, the computing server 110 may finalize or adjust the category assignment for the data instance. Responsive to the user confirming the suggested category, the computing server 110 may store this assignment in the data store 120. Responsive to the user suggesting a different category, the computing server 110 may update the data instance with the user-specified category. This process may provide that the final categorization corresponds to the user's intent and knowledge, overriding the machine learning model's suggestion when necessary. The system may also use this feedback to update its learning model, improving future categorization accuracy. By incorporating user feedback into the final category assignment, the computing server 110 may provide a more accurate and personalized categorization system that balances automated efficiency with user-specific knowledge and preferences.

Figure 4:
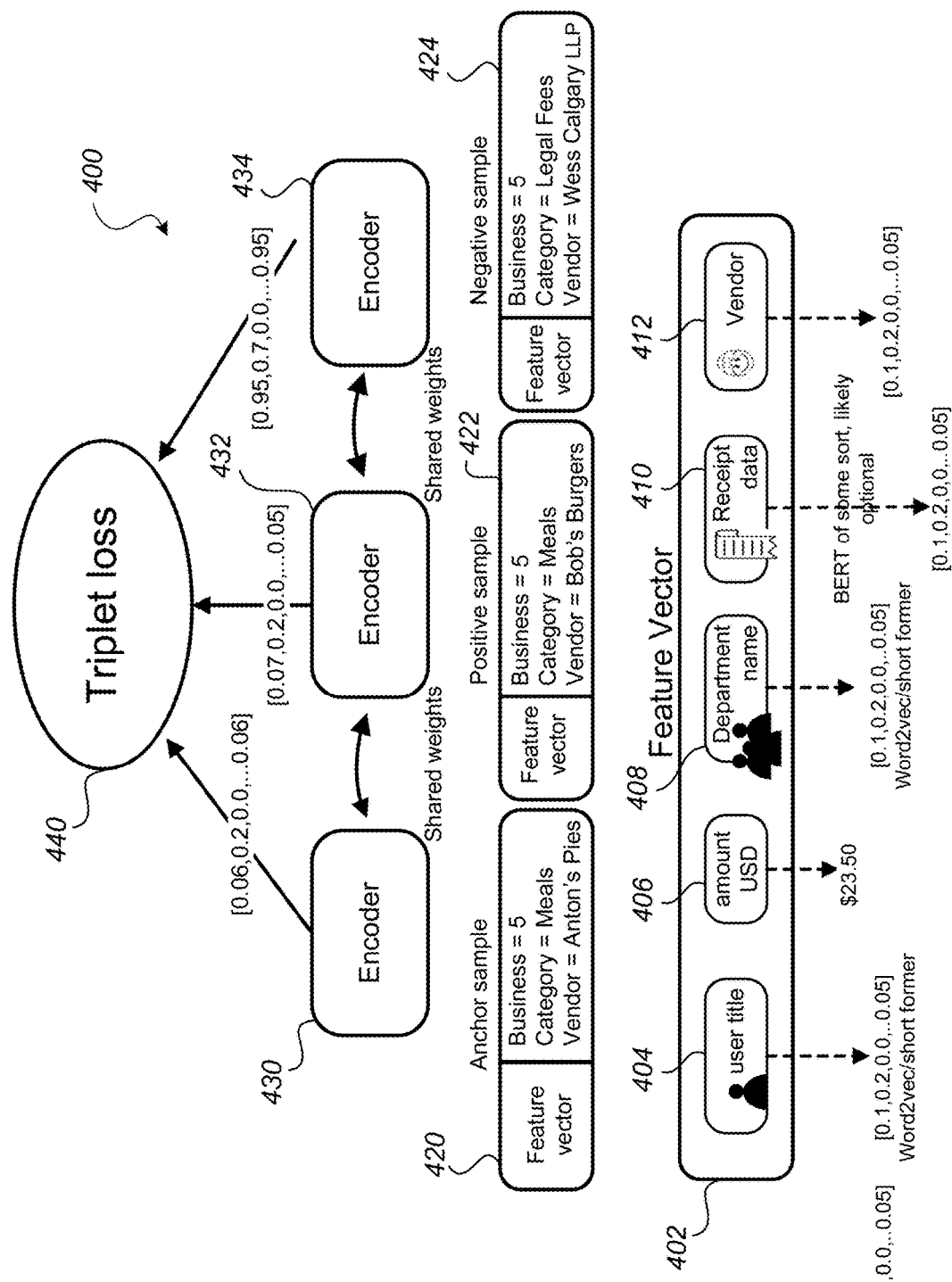
FIG. 4 is a diagram of a process for training of a machine-learned encoder model, in accordance with an embodiment.

FIG. 4 illustrates a triplet loss network 400. The triplet loss network 400 includes machine-learned encoder models 430, 432, and 434. The triplet loss network is designed to optimize embeddings for the feature vector 402, wherein a model minimizes the distance between an anchor instance and a positive instance (both belonging to the same category) and maximizes the distance between the anchor instance and a negative instance (belonging to a different category). This process is facilitated by the triplet loss function 440, which acts as the measurement for these distances.

The feature vector 402 includes multiple types, including user features 404, amount features 406, department name features 408, receipt features 410, and vendor features 412. Employing these features, the model trains multiple encoders 430, 432, and 434 using the following training samples: anchor data instance 420, a positive data instance 422, and a negative data instance 424.

The machine-learned encoder models learn the embeddings for anchor 420, positive 422 and negative 424 data instances. The loss function used here is the triplet loss 440, which measures the distance between the anchor-positive and anchor-negative pairs in the embedding space, and is optimized to reduce the distance between positive pairs and increase the distance between negative pairs.

In the forward pass, the selected machine-learned encoder model takes the anchor 420, positive 422, and negative 424 instances and generates corresponding embeddings using the encoders 430, 432 and 434. The triplet loss 440 is then computed by calculating the relative distances between these embeddings. In the backward pass, the model calculates the gradients of the loss with respect to the network's parameters and updates the model's weights using optimization techniques like stochastic gradient descent, thereby reducing the loss. After training, the model's performance may be evaluated on a separate validation dataset (that the model has not seen during training). This helps assess how well the model generalizes to unseen data and prevents overfitting.

Category Assignment Correctness & Suggestions

In some embodiments, there is provided a machine-learned encoder model for category assignment and suggestions. The provided model may be similar to the ones described under the section Machine Learning Models below. One of the objectives of the machine-learned encoder may be to determine the accuracy of a category assignment for a given transaction. The model may output a value within the [0,1] range, which corresponds to the probability of the correct assignment of the category. The model may suggest one or more categories for a given transaction and rank each one of the suggested categories. The model may retrieve the categories from a list of custom-defined categories saved on a third party database, perform category prediction based on inputs, and then output a list of suggested categories. The suggested categories may be ranked from high to low. The training data for this model may be stored on the third party database.

To make the training data reflect a real-world distribution of categories, each transaction may be duplicated n_random_negative+n_hard_negative times, where: n_random_negative is a number of candidates picked on random from the list of all categories, and n_hard_negative is a number of candidates picked from the list that semantically sound most similar to the true transaction category. This may allow the model to learn from easy and difficult examples, and be discriminative.

During a preprocessing step, the model may rely on a set of features extracted from transaction metadata and candidate categories. The features maybe broken into groups: (a) transaction metadata (4 features) such as merchant name, department name, stock keeping category name, cleared amount; and (b) likelihood table-derived features (21 features), conditional on merchant name, department name and stock keeping category name.

The likelihood table may be a table of conditional probabilities. It may be conditional based on a given merchant name, department name, stock keeping category name or their combination. Three likelihood tables may be used: merchant name, merchant/department name, stock keeping category name. Two entries from each of the tables may be extracted based on the probability of a category assignment being correct. For each candidate, a probability of being correct may be determined based on the likelihood tables.

All the string-typed features may be converted to dense vector representation using a pre-trained Word2Vec model. The candidate category strings may also be preprocessed using CountVectorizer. CountVectorizer may limit the vocabulary to the most frequent N words seen across categories. It may also remove stopwords that add little context. It may also act as a regularization mechanism.

The model may be trained using the PyTorch Lightning framework using the DeepFM-like architecture, with a few modifications. For example, there may not be a need for embedding learning as the model leverages Global Vectors for Word Representation (GloVE), which is an unsupervised learning algorithm for generating word embeddings. For example, the architecture may be less deep than the original DeepFM. The model may not expect sparse inputs.

In terms of performance, possible tradeoffs may exist between high precision identification of transactions and recall. Recall include situations where some transactions worth overriding are flagged. The focus may be on precision, given a possible marginal override rate around 10%.

Some performance metrics may include the percentage of times a suggested override is accepted. Additionally, the percentage of time that a suggested override is accepted, which is an indicator of how many transactions were overridden and changed by the reviewer, may be monitored. The value proposition for this system revolves around efficiency and accuracy.

The value proposition for the present system revolves around efficiency and accuracy. By automating the process of category assignment for transactions, specifically via the application of the machine-learning model, this system may significantly reduce the manual effort required from both cardholders and reviewers. This may lead to quicker transaction processing times and allow individuals to focus their efforts on more value-added tasks. Furthermore, accurate categorization may lead to better financial management and decision-making, potentially saving organizations more money in the long run. As the system improves categorization, it may generate cleaner, high-quality financial data. This may lead to better reporting and analytics.

Transaction Annotation Interfaces

Figure 5:
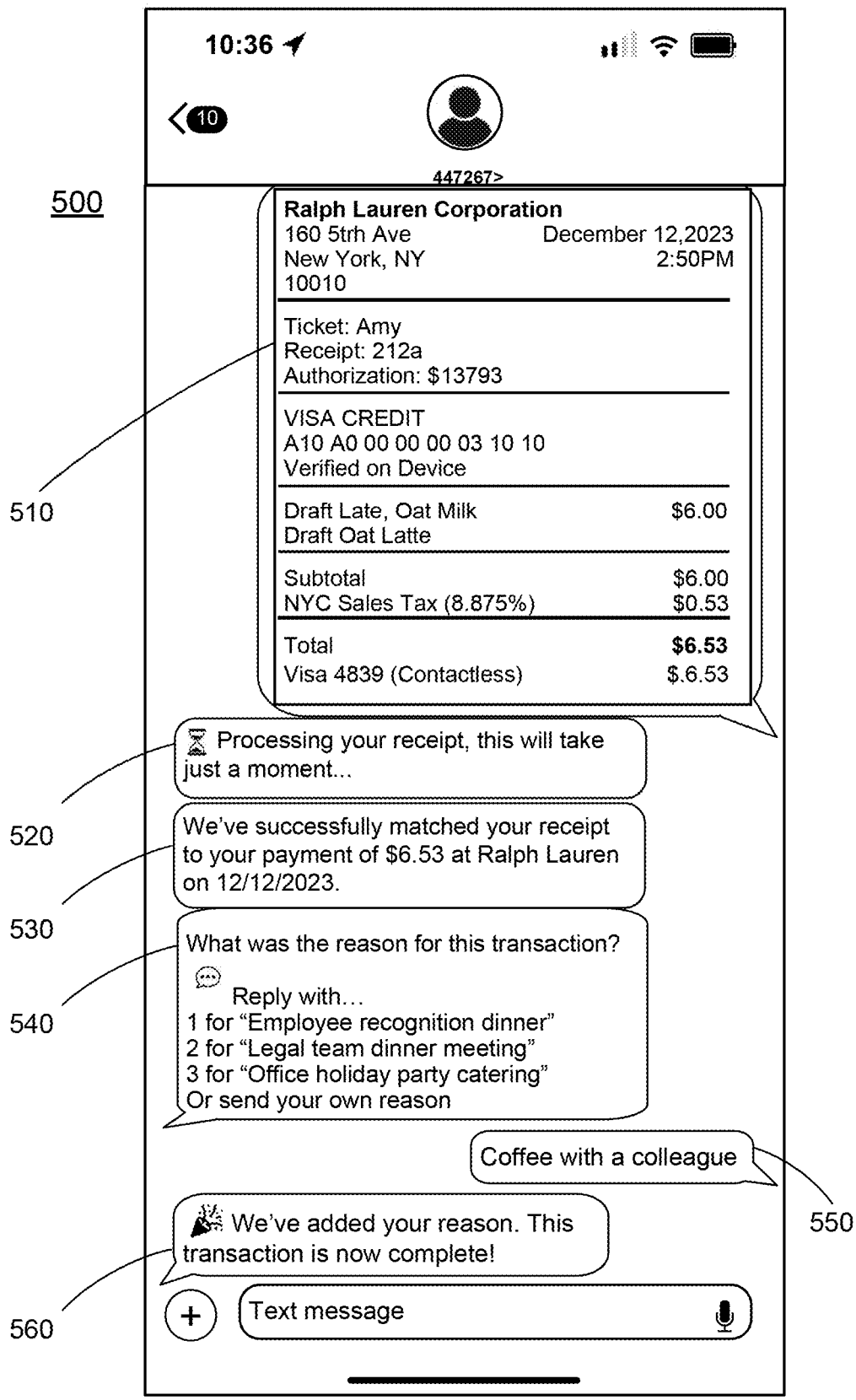
FIGS. 5-6 depict example user interfaces, in accordance with embodiment.
Figure 6:
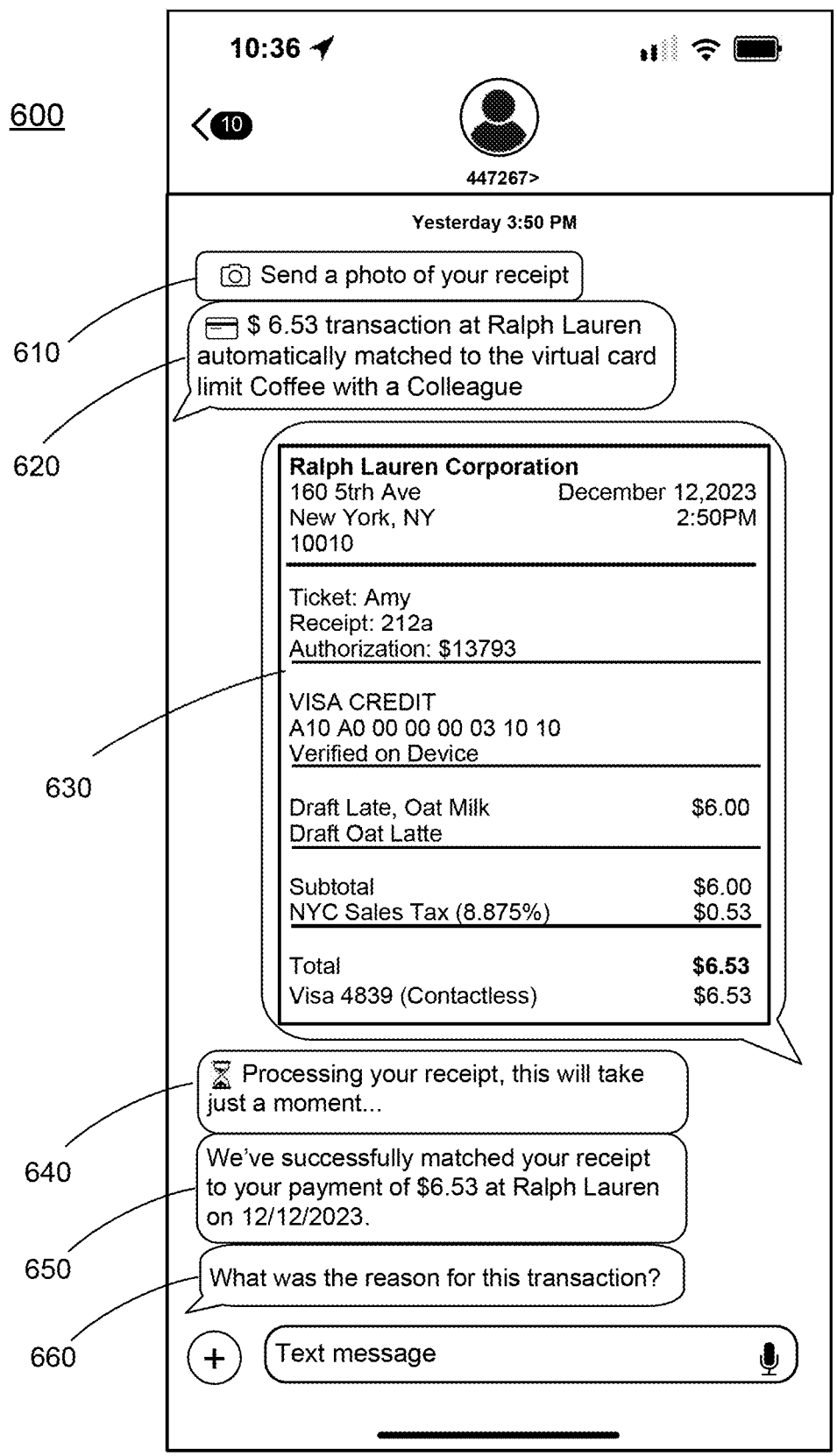

FIGS. 5-6 illustrate user interfaces 500 and 600 that demonstrate how a client device 150 interacts with the computing server 110 to process transaction data instances. These interfaces primarily use SMS as the communication channel. The computing server's interface 270 may generates these SMS messages, which are then displayed on the client device 150 using local applications.

In FIG. 5, the interface 500 shows a series of SMS interactions (510-550) between the end user and the computing server 110. The end user utilizes their client device 150 to send and receive these SMS messages. Additionally, the end user can use the client device 150 to photograph transaction documentation (such as receipts) and send these images to the computing server 110 for processing. The computing server 110 can maintain a profile for each end user in its client profile management engine 210, which includes contact information like email addresses and phone numbers. The phone number associated with the client device 150 is used for SMS communication.

Referring to FIG. 5, at 510, the end user sends a photo of a transaction receipt to the server. At 520-540, the computing server 110 processes the photo, matches it to a prior transaction, and offers three possible category assignments. At 550, the user selects a category. At 560, the computing server 110 confirms the successful category assignment.

FIG. 6 shows a slightly different interaction flow in interface 600. At 610-620, the computing server 110 requests a photo of a transaction receipt and provides additional context about the transaction. At 630, the user sends the requested photo. At 640-650, the computing server 110 processes the photo and assigns a category to the transaction.

Machine Learning Models

In various embodiments, a wide variety of machine-learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used.

In various embodiments, the training techniques for a machine learning model may be supervised, semi-supervised, or unsupervised. In supervised learning, the machine learning models may be trained with a set of training samples that are labeled. Any one of a number of supervised learning techniques may be used to train the models. Examples include, but are not limited to, random forests and other ensemble learning techniques, support vector machines (SVM), and logistic regression. In some cases, an unsupervised learning technique may be used, where the samples used in training are not labeled. Various unsupervised learning techniques such as clustering may be used.

In some embodiments, the machine-learned model may be a large language model (LLM) that is specifically designed to generate human-like text. This machine-learned model is part of a broader category of machine-learning models known as transformer models, which allow them to understand and process a natural language such as the language that humans naturally use to communicate. LLMs are categorized as large because they have numerous parameters (billions in some cases) that they adjust during the training process. The size of these models helps them better understand and generate human-like text because they can learn from a vast amount of data, memorizing a larger amount of information about language patterns and structures.

A generative pretrained transformer (GPT) is an example of an LLM. It may be trained on diverse data sets in an unsupervised learning manner, which means no explicit instructions or labels were provided to it during the training phase. Instead, it learned patterns and relationships from the data it was trained on and used these patterns to generate text that resembles human-written content. In practice, these models take a prompt (a piece of text input) and generate a text continuation. They predict the next part of a text based on the patterns they have learned and the specific prompt provided. LLMs have the ability to generate diverse types of text in a human-like manner, ranging from simple sentences to full articles. They may be used for a variety of applications such as draft generation, brainstorming ideas, writing assistance, and even in complex tasks like generating code or translating languages.

In the context of allocating transactions to certain user-defined rules, the LLM may interpret, understand and predict transaction classifications based on the data it is provided. For example, the LLM may be a prompt, which includes structured data about the transaction, past transactions, and the rules and/or budgets. The LLM may process the prompt and generate an output that allocates the transaction to one of the rules. This machine-learned model may understand complex patterns in transaction data by learning from past transactions and user rules. It may operate by comparing the current transaction with past transactions and the rules to determine the most appropriate allocation.

Figure 7:
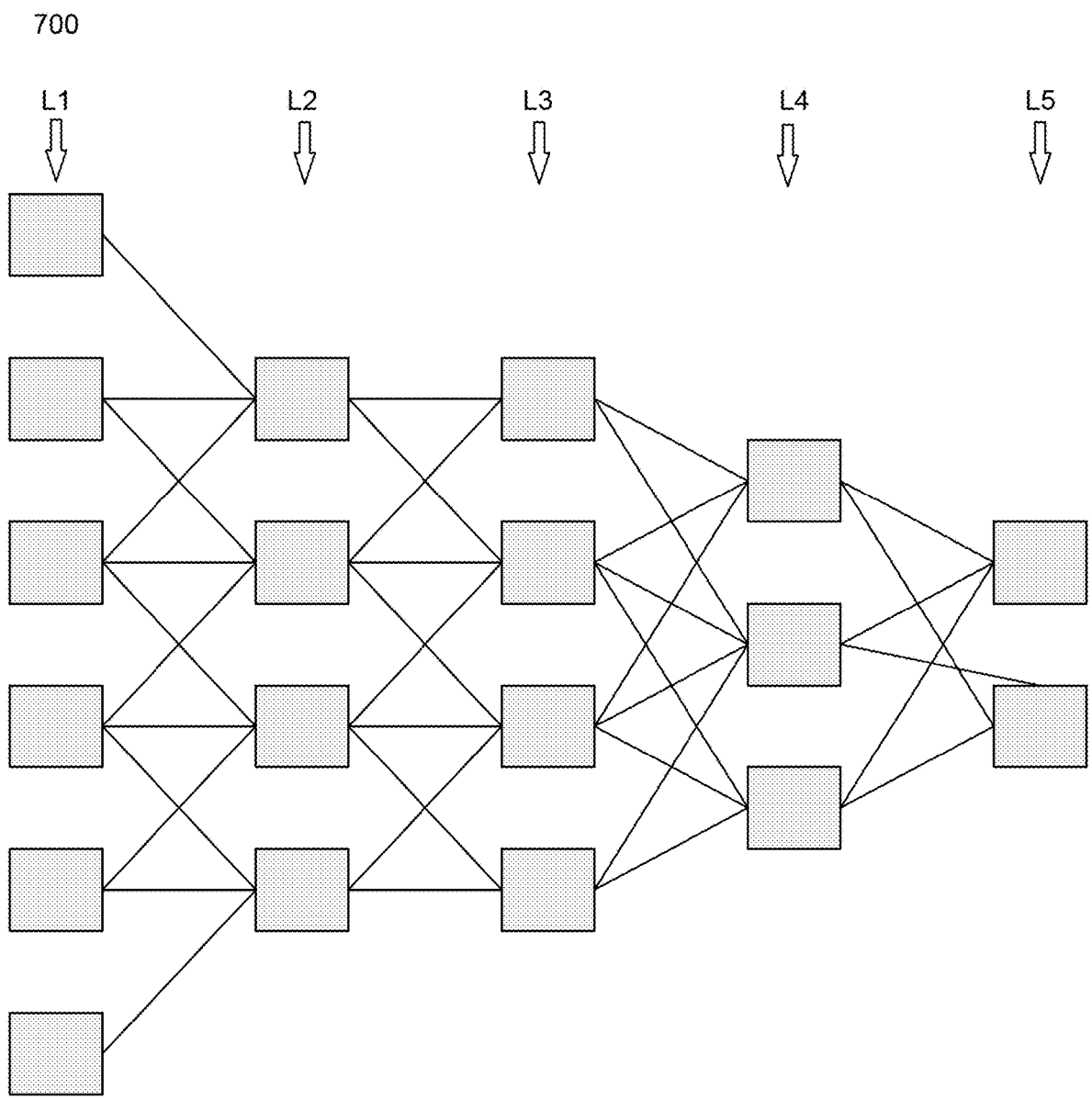
FIG. 7 is an example model that may be used to generate an embedding, in accordance with an embodiment.

FIG. 7 shows an example machine-learned model 700 that may be used to generate an embedding. The machine learned encoder model discussed in FIGS. 3 and 4 may include the architecture of machine-learned model 700. The network model shown in FIG. 7, also referred to as a deep neural network, comprises a plurality of layers (e.g., layers L1 through L5), with each of the layers including one or more nodes. Each node has an input and an output and is associated with a set of instructions corresponding to the computation performed by the node. The set of instructions corresponding to the nodes of the network may be executed by one or more computer processors.

Each connection between nodes in the machine-learned model 700 may be represented by a weight (e.g., numerical parameter determined through a training process). In some embodiments, the connection between two nodes in the machine-learned model 700 is a network characteristic. The weight of the connection may represent the strength of the connection. In some embodiments, connections between a node of one level in the machine-learned model 700 are limited to connections between the node in the level of the machine-learned model 700 and one or more nodes in another level that is adjacent to the level including the node. In some embodiments, network characteristics include the weights of the connection between nodes of the neural network. The network characteristics may be any values or parameters associated with connections of nodes of the neural network.

A first layer of the machine-learned model 700 (e.g., layer L1 in FIG. 7) may be referred to as an input layer, while a last layer (e.g., layer L5 in FIG. 7) may be referred to an output layer. The remaining layers (layers L2, L3, L4) of the machine-learned model 700 are referred to are hidden layers. Nodes of the input layer are correspondingly referred to as input nodes; nodes of the output layer are referred to as output nodes, and nodes of the hidden layers are referred to as hidden nodes. Nodes of a layer provide input to another layer and may receive input from another layer. For example, nodes of each hidden layer (L2, L3, L4) are associated with two layers (a previous layer and a next layer). A hidden layer (L2, L3, L4) receives an output of a previous layer as input and provides an output generated by the hidden layer as an input to a next layer. For example, nodes of hidden layer L3 receive input from the previous layer L2 and provide input to the next layer L4.

The layers of the machine-learned model 700 are configured to identify one or more embeddings of transaction data. For example, an output of the last hidden layer of the machine-learned model 700 (e.g., the last layer before the output layer, illustrated in FIG. 7 as layer L4) indicates one or more embeddings of a transaction. An embedding may be a high-dimensional vector. In some embodiments, the embeddings may also be extracted from any intermediate layer.

In some embodiments, the weights between different nodes in the machine-learned model 700 may be updated using machine learning techniques. For example, the machine-learned model 700 may be provided with training data identifying transactions with a label of transaction rule assignment applied to each rule. The label applied to a transaction may be based on transaction data of the computing server 110. In some embodiments, the training of the machine-learned model 700 may also be the training or fine tuning of a machine-learned language model. In some embodiments, the training data comprises a set of feature vectors corresponding to a transaction, with each feature vector of the training data associated with a corresponding label related to a transaction rule. Features of a transaction of the training set determined by the machine-learned model 700 are compared from the output layer of the network model and the label applied to the transaction of the training set, and the comparison is used to modify one or more weights between different nodes in the machine-learned model 700, modifying an embedding output by the machine-learned model 700 for the transaction.

Training of a machine-learned model 700 may include an iterative process that includes iterations of making determinations, monitoring the performance of the machine-learned model 700 using the objective function, and backpropagation to adjust the weights (e.g., weights, kernel values, coefficients) in various nodes. For example, a computing device may receive a training set that includes training data and labels assignments. The computing device, in a forward propagation, may use the machine-learned model 700 to generate predicted the label. The computing device may compare the predicted label with the labels of the training sample. The computing device may adjust, in a backpropagation, the weights of the machine-learned model 700 based on the comparison. The computing device backpropagates one or more error terms obtained from one or more loss functions to update a set of parameters of the machine-learned model 700. The backpropagating may be performed through the machine-learned model 700 and one or more of the error terms based on a difference between a label in the training sample and the generated predicted value by the machine-learned model 700.

By way of example, each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine-learned model 700 has converged) or after a predetermined number of rounds for a particular set of training samples. The trained machine-learned model 700 can be used for make inference or another suitable task for which the model is trained.

In some embodiments, such as using a language model to generate embedding, training may be performed using an unsupervised learning techniques. Existing models such as those provided by the model serving system 170 may also be used for generating embeddings.

In various embodiments, the training samples described above may be refined and continue to re-train the model, which the model's ability to perform the inference tasks. In some embodiments, this training and re-training processes may repeat, which results in a computer system that continues to improve its functionality through the use-retraining cycle. For example, after the model is trained, multiple rounds of re-training may be performed. The process may include periodically retraining the machine-learned model 700. The periodic retraining may include obtaining an additional set of training data, such as through other sources, by usage of users, and by using the trained machine-learned model 700 to generate additional samples. The additional set of training data and later retraining may be based on updated data describing updated parameters in training samples. The process may also include applying the additional set of training data to the machine-learned model 700 and adjusting parameters of the machine-learned model 700 based on the applying of the additional set of training data to the machine-learned model 700. The additional set of training data may include any features and/or characteristics that are mentioned above.

The computing server 110 may an embedding for a transaction and the embedding may include a multidimensional vector (e.g., N>10) representing the transaction in a latent space. The computing server 110 may use any suitable method for generating an embedding for the query. Example methods for generating the embedding for the query include Word2Vec, GloVE, as a layer in a neural network trained from a training set of documents or other text data, or any other suitable method.

Computing Machine Architecture

Figure 8:
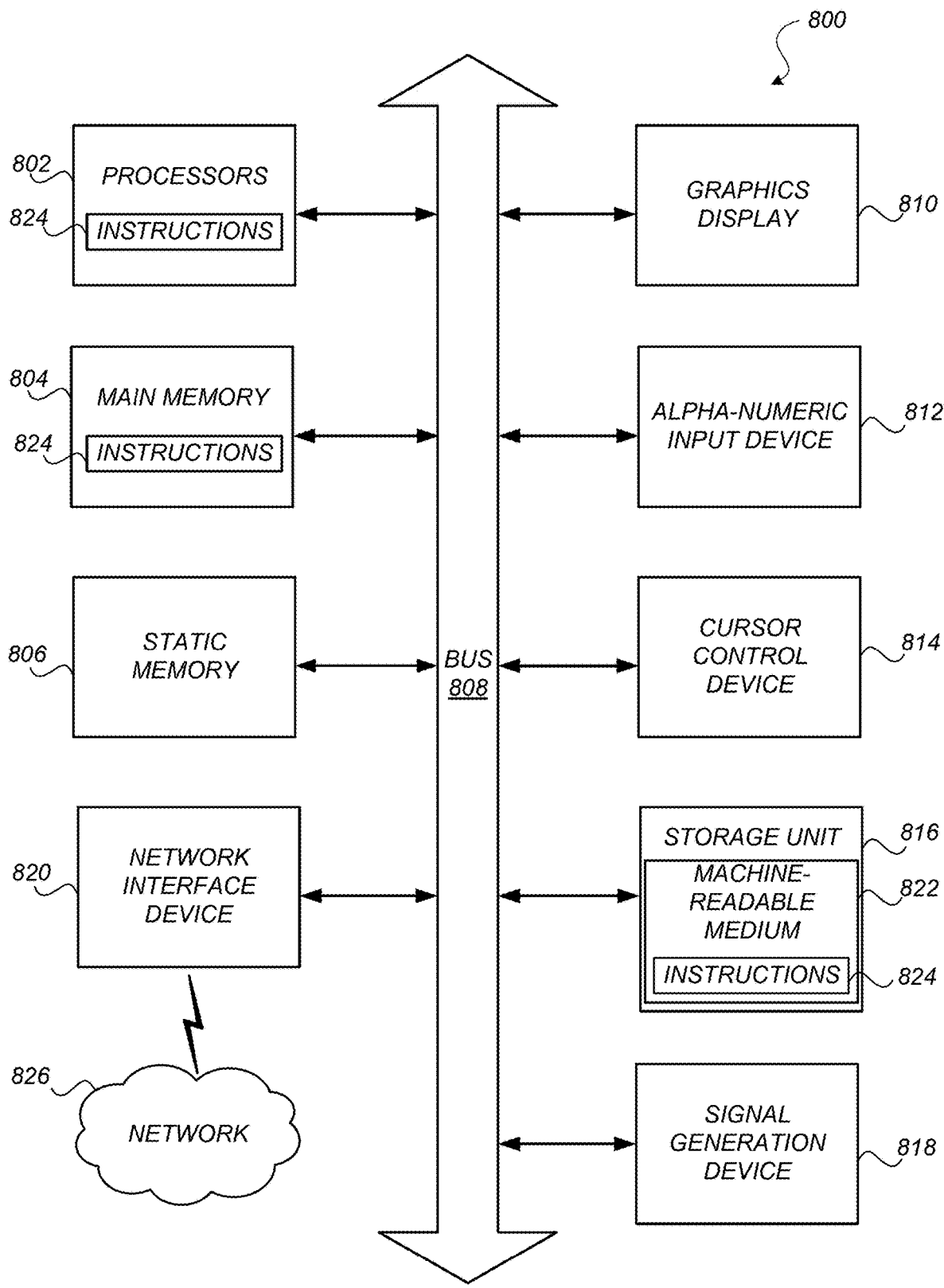
FIG. 8 is a block diagram illustrating components of an example computing machine, in accordance with an embodiment.

FIG. 8 is a block diagram illustrating components of an example computing machine that is capable of reading instructions from a computer-readable medium and executing them in a processor (or controller). A computer described herein may include a single computing machine shown in FIG. 8, a virtual machine, a distributed computing system that includes multiple nodes of computing machines, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to, the client device 150, the computing server 110, and various engines, interfaces, terminals, and machines shown in FIG. 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the terms "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that stores computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 802 and reduce the space required for the memory 804. For example, the database processing techniques and machine learning methods described herein reduce the complexity of the computation of the processors 802 by applying one or more novel techniques that simplify the steps in training, reaching convergence, and generating results of the processors 802. The algorithms described herein also reduce the size of the models and datasets to reduce the storage space requirement for memory 804.

The performance of certain operations may be distributed among more than one processor, not only residing within a single machine but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause the one or more processors to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processor 802, displays a GUI to display one or more results and data generated by the processes described herein. The computer system 800 may also include an alphanumeric input device 812 (e.g., a keyboard), a cursor control device 814 (e.g., a mouse, a trackball, a joystick, a motion sensor, or other pointing instruments), a storage unit 816 (a hard drive, a solid-state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter that can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that are issue on an application based hereon. Accordingly, the disclosure of the embodiments is intended to be illustrative, but not limited, of the scope of the patent rights.

What is claimed is:

1. A computer-implemented method, comprising:
   receiving, through a message communication channel from a user, a documentation of a transaction;
   parsing data in the documentation to create a data instance representing the transaction in a database;
   determining that the data instance needs an assignment of a category from a list of custom-defined categories;
   applying a machine-learned encoder model to one or more features of the data instance to determine one or more candidate categories from the list of custom-defined categories;
   transmitting, automatically and responsive to receiving the documentation from the user, a response message to the user through the message communication channel, wherein the response message comprises at least one of candidate categories determined by the machine-learned encoder model;
   responsive to transmitting the response message to the user, receiving feedback from the user; and
   generating a category assignment for the data instance based on the feedback received from the user.

2. The computer-implemented method of claim 1, wherein the documentation is an image of a physical document.

3. The computer-implemented method of claim 1, wherein the message communication channel comprises a short message service (SMS) message, an email, or a software as a service (SaaS) platform.

4. The computer-implemented method of claim 1, wherein parsing the data in the documentation comprises:
   applying a natural language generation process to identify information within the documentation for creating the data instance.

5. The computer-implemented method of claim 1, wherein determining that the data instance needs an assignment of a category comprises:
   identifying the data instance as a new transaction without historical categorization;
   detecting an absence of a category label in the data instance; or
   receiving a user request for category assignment of the data instance.

6. The computer-implemented method of claim 1, wherein applying the machine-learned encoder model to the features of the data instance comprises:
   training the machine-learned encoder model that generates embeddings of data instances, wherein the machine-learned encoder model is trained to separate a plurality of embeddings of positive data instances that belong to a target category from a plurality of embeddings of negative data instances.

7. The computer-implemented method of claim 6, wherein training the machine-learned encoder model that generates embeddings of data instances comprises:
   initializing the machine-learned encoder model with predetermined parameters;
   defining a loss function that calculates a relationship between embeddings of anchor, positive and negative data instances;
   training the machine-learned encoder model by processing each training sample to generate embeddings using the loss function; and
   evaluating the training of the machine-learned encoder model.

8. The computer-implemented method of claim 7, wherein initializing the machine-learned encoder model with the predetermined parameters comprises:
   defining an architecture of embedded spaces where data instances are mapped, wherein the architecture includes multiple layers, each laying performing a particular operation on data instances; and
   defining data flow through the layers of the machine-learned encoder model from input to embedded output.

9. The computer-implemented method of claim 7, wherein defining the loss function that calculates the relationship between embeddings of anchor, positive and negative data instances comprises:
   defining a triplet loss function to minimize the relative distance between embeddings of positive data instances and maximize the relative distance between embeddings of negative data instances.

10. The computer-implemented method of claim 7, wherein evaluating the training of the machine-learned encoder model comprises:
    applying a validation dataset to the machine-learned encoder model, the validation dataset comprising a plurality of data instances representing diverse categories from a list of custom categories in a database; and
    determining a metric for the machine-learned encoder model, the metric measuring a performance of the model in minimizing the calculated loss function and categorizing new data instances correctly through a comparison of model-predicted categories and actual categories.

11. The computer-implemented method of claim 1, wherein applying the machine-learned encoder model to the features of the data instance comprises:
    accessing, by the machine-learned encoder model, the features of the data instance;
    generating, by the machine-learned encoder model, embeddings from the features of the data instance, the embeddings being in multiple layers in a latent space of the machine-learned encoder model;
    comparing, by the machine-learned encoder model, the data instance embeddings with embeddings that the machine-learned encoder model has learned for each data category during training; and
    assigning, by the machine-learned encoder model, a category to the instance based at least on the comparing.

12. The computer-implemented method of claim 1, wherein transmitting the response message to the user comprises:
    generating the response message by applying a natural language generation process to the data instance and its category assignment to provide one or more sentences that present them to the user; and
    transmitting the message to the user through the message communication channel.

13. A non-transitory computer-readable storage medium configured to store computer code comprising instructions, the instructions, when executed by one or more processors, cause the one or more processors to:
    receive, through a message communication channel from a user, a documentation of a transaction;
    parse data in the documentation to create a data instance representing the transaction in a database;
    determine that the data instance needs an assignment of a category from a list of custom-defined categories;
    apply a machine-learned encoder model to one or more features of the data instance to determine one or more candidate categories from the list of custom-defined categories;
    transmit, automatically and responsive to receiving the documentation from the user, a response message to the user through the message communication channel, wherein the response message comprises at least one of candidate categories determined by the machine-learned encoder model;
    responsive to transmitting the response message to the user, receive feedback from the user; and
    generate a category assignment for the data instance based on the feedback received from the user.

14. The non-transitory computer-readable storage medium of claim 13, wherein the documentation is an image of a physical document.

15. The non-transitory computer-readable storage medium of claim 13, wherein the message communication channel comprises a short message service (SMS) message, an email, or a software as a service (SaaS) platform.

16. The non-transitory computer-readable storage medium of claim 13, wherein parsing the data in the documentation comprises:
    applying a natural language generation process to identify information within the documentation for creating the data instance.

17. The non-transitory computer-readable storage medium of claim 13, wherein determining that the data instance needs an assignment of a category comprises:
    identifying the data instance as a new transaction without historical categorization;
    detecting an absence of a category label in the data instance; or
    receiving a user request for category assignment of the data instance.

18. The non-transitory computer-readable storage medium of claim 13, wherein applying the machine-learned encoder model to the features of the data instance comprises:
    training the machine-learned encoder model that generates embeddings of data instances, wherein the machine-learned encoder model is trained to separate a plurality of embeddings of positive data instances that belong to a target category from a plurality of embeddings of negative data instances.

19. The non-transitory computer-readable storage medium of claim 18, wherein training the machine-learned encoder model that generates embeddings of data instances comprises:
    initializing the machine-learned encoder model with predetermined parameters;

defining a loss function that calculates a relationship between embeddings of anchor, positive and negative data instances;

training the machine-learned encoder model by processing each training sample to generate embeddings using the loss function; and evaluating the training of the machine-learned encoder model.

20. A system, comprising:

one or more processors; and memory configured to store instructions, the instructions, when executed by the one or more processors, cause the one or more processors to:

receive, through a message communication channel from a user, a documentation of a transaction;

parse data in the documentation to create a data instance representing the transaction in a database;

determine that the data instance needs an assignment of a category from a list of custom-defined categories;

apply a machine-learned encoder model to one or more features of the data instance to determine one or more candidate categories from the list of custom-defined categories;

transmit, automatically and responsive to receiving the documentation from the user, a response message to the user through the message communication channel, wherein the response message comprises at least one of candidate categories determined by the machine-learned encoder model;

responsive to transmitting the response message to the user, receive feedback from the user; and generate a category assignment for the data instance based on the feedback received from the user.

\* \* \* \* \*